United States Patent Office 3,644,620
Patented Feb. 22, 1972

3,644,620
ANTIPHLOGISTIC
William J. Vittone, Rte. 1, Box 7, Hurley, Wis. 54534
No Drawing. Filed May 22, 1970, Ser. No. 39,884
Int. Cl. A61k 27/00
U.S. Cl. 424—195
2 Claims

ABSTRACT OF THE DISCLOSURE

An antiphlogistic remedy for external use in the treatment of inflammation of joints as in arthritis, treatment of degeneration of the bone, bursitis and treatment of the sinuses, and the method of preparing the particular antiphlogistic.

This invention relates broadly to the medicinal arts and in its more specific aspects it relates to an antiphlogistic which is indicated in the treatment of arthritis, degeneration of bone, various types of inflammation of the joints, bursitis and the sinuses.

My experiments in this discipline, of remedial externally applied antiphlogistics in the treatment of various types of joint inflammation and joint degeneration, has shown that the antiphlogistic which I have evolved is successful not only in the arresting of the inflammation, but also in many instances in the cure thereof. These results, which I have obtained are evidence of the fact that the antiphlogistic, to be fully described herein, represents a substantial advance in the art of treating certain types of diseases.

It will be apparent, as this description proceeds, that the ingredients which I utilize in the preparation of this formula are relatively inexpensive and easily obtained.

The ease of preparing the antiphlogistic also constitutes one of the significant characteristics of my invention, and in the method which is practiced in the preparation of my antiphlogistic a specific change occurs in one of the ingredients thereof whereby the producer is informed when the steps constituting the production are completed and the antiphlogistic is in proper condition for use and external application to the patient.

Successful treatment has resulted from the external application of an antiphlogistic involving the following ingredients in the following listed proportions.

13 ounces of methyl alcohol
$10/16$ ounces of camphor
$8/16$ ounces of spearmint
$8/16$ ounces of oil sassafras
$2/16$ ounces of oil cloves
$12/16$ ounces of methyl salicylate
$1/16$ ounces of oil of mustard
$7/16$ ounces of peppermint
8 ounces of kerosene
1 cup green spruce needles In preparing this antiphlogistic a first solution is formed of 5 ounces of methyl alcohol and the above listed amounts of camphor, spearmint, oil of sassafras, oil of cloves, methyl salicylate, oil of mustard and peppermint. To this solution 8 ounces of kerosene and 8 ounces of methyl alcohol are added, and the solution is agitated and to this agitated solution is added one cup of green spruce needles. This solution is then permitted to stand for approximately 10 days or until the spruce needles turn white, whereupon it is strained and is then in proper condition for use.

The above proportions of ingredients which are mixed together in the preparation of my antiphlogistic may be varied within limits and still fall within the spirit and scope of my invention.

I claim:
1. A method of preparing an antiphlogistic comprising mixing together 13 ounces of methyl alcohol, $10/16$ ounces of camphor, $8/16$ ounces of spearmint, $8/16$ ounces of oil of sassafras, $2/16$ ounces of oil of cloves, $12/16$ ounces of methyl salicylate, $1/16$ ounces of oil of mustard and $7/16$ ounces of peppermint, agitating said mixture and then adding thereto 8 ounces of kerosene, 8 ounces of methyl alcohol and 1 cup of green spruce needles, permitting the mixture to rest until the green spruce needles turn white, and then straining the needles from the mixture whereupon the antiphlogistic is in condition ready for external application.

2. A method of preparing an antiphlogistic in accordance with claim 1 wherein the antiphlogistic consists of 13 ounces of methyl alcohol, $10/16$ ounces of camphor, $8/16$ ounces of spearmint, $8/16$ ounces of oil of sassafras, $2/16$ ounces of oil of cloves, $12/16$ ounces of methyl salicylate, $1/16$ ounces of oil of mustard, $7/16$ ounces of peppermint, 8 ounces of kerosene and 1 cup of green spruce needles.

References Cited

UNITED STATES PATENTS

| | | | |
|---|---|---|---|
| 97,345 | 11/1869 | Bessell | 424—195 |
| 138,313 | 4/1873 | Benda | 424—195 |
| 284,629 | 9/1883 | Guilliouema | 424—195 |
| 403,121 | 5/1889 | Martin | 424—195 |
| 416,409 | 12/1889 | Hoover | 424—195 |

STANLEY J. FRIEDMAN, Primary Examiner

U.S. Cl. X.R.

424—230